July 8, 1969      D. R. HOUSTON      3,453,901

STEERING COLUMN MOUNTED GEARSHIFT LEVER MECHANISM

Filed Dec. 21, 1967      Sheet 1 of 2

INVENTOR:
David R. Houston

July 8, 1969  D. R. HOUSTON  3,453,901
STEERING COLUMN MOUNTED GEARSHIFT LEVER MECHANISM
Filed Dec. 21, 1967  Sheet 2 of 2
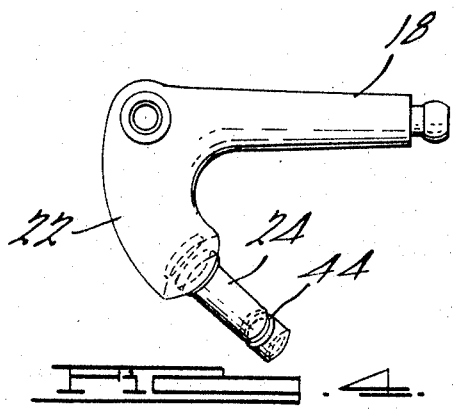
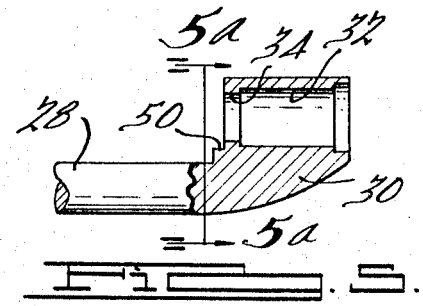
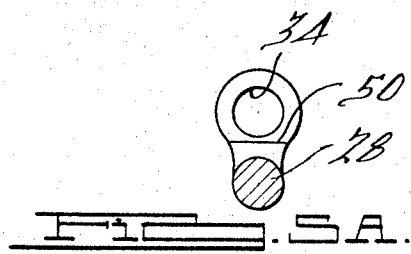
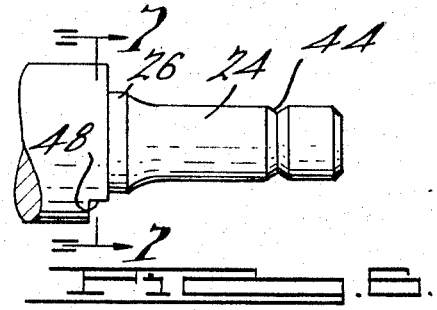
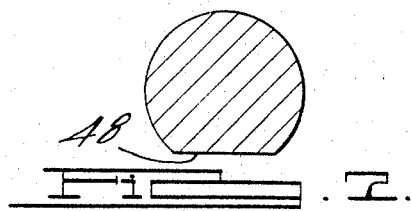
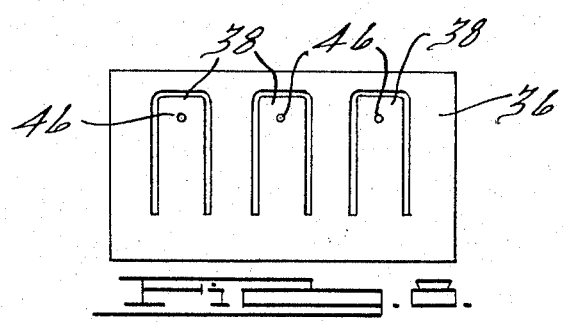
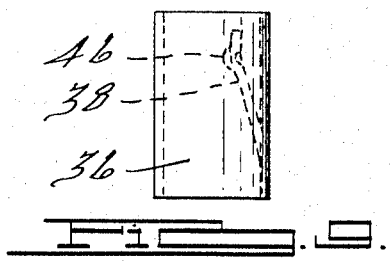
INVENTOR:
DAVID R. HOUSTON
BY
ATTORNEYS.

United States Patent Office 3,453,901
Patented July 8, 1969

3,453,901
STEERING COLUMN MOUNTED GEARSHIFT
LEVER MECHANISM
David R. Houston, Westland, Mich., assignor to Ford
Motor Company, Dearborn, Mich., a corporation of
Delaware
Filed Dec. 21, 1967, Ser. No. 692,347
Int. Cl. G05g 11/00, 1/10
U.S. Cl. 74—484                                    6 Claims

ABSTRACT OF THE DISCLOSURE

A lever assembly for controlling ratio shifts in a multiple speed power transmission mechanism for an automotive vehicle driveline, a first portion of the lever assembly being fixed to an axially fast portion of the steering column, a driver-operated portion of the lever assembly being removable from the first portion upon receiving an impact load from an object within the vehicle passenger compartment or upon being impacted by a vehicle passenger.

Brief summary of the invention

In automotive vehicle driveline installations it is usual practice to support a driver-operated gearshift mechanism within the vehicle passenger compartment on the vehicle steering column assembly. This mechanism includes a gearshift lever that extends in a radially outward direction below the vehicle steering wheel where it readily can be gripped by the driver. The radially inward end of the gearshift lever is mounted pivotally on a relatively stationary linkage portion that is journaled on the steering column assembly.

A gearshift shaft, which forms a part of the steering column assembly, is joined to the relatively stationary portion where it can be rotated about its axis or shifted in the direction of its axis, or both, during gear ratio changes initiated by the vehicle operator. The lower end of the gearshift shaft is connected mechanically to the vehicle power transmission mechanism in the vehicle driveline through a suitable motion transmitting linkage.

When the extended end of the gearshift lever is subjected to an impact load, the gearshift lever will become disassembled readily from its mounting structure. This occurs when the impact load has a substantial axial component relative to the axis of the shaft.

The shift lever is formed with a section modulus that is of a predetermined low value to permit the lever to yield when it is subjected to an impact load in a relatively transverse direction with respect to the axis of the lever. This bending action, as well as the ability of the gear shift lever to become disassembled, reduces the possibility of injury to a vehicle passenger or the driver of the vehicle if he should come in contact with the gearshift lever.

Brief description of the figures of the drawing

FIGURE 4 is a detail view of a portion of the steering column assembly shown in FIGURE 3;

FIGURE 5 is an enlarged view of one part of the assembly of FIGURE 3;

FIGURE 5a is a sectional view taken along section line 5a—5a of FIGURE 5;

FIGURE 6 is an enlarged view of another part of the assembly of FIGURE 3;

FIGURE 7 is a cross-sectional view taken along the plane of section line 7—7 of FIGURE 6;

FIGURE 8 is an unwrapped detail view of a spring detent sleeve for the assembly of FIGURE 3; and FIGURE 9 is a side view of the spring of FIGURE 8.

Particular description of the invention

Figure 1:
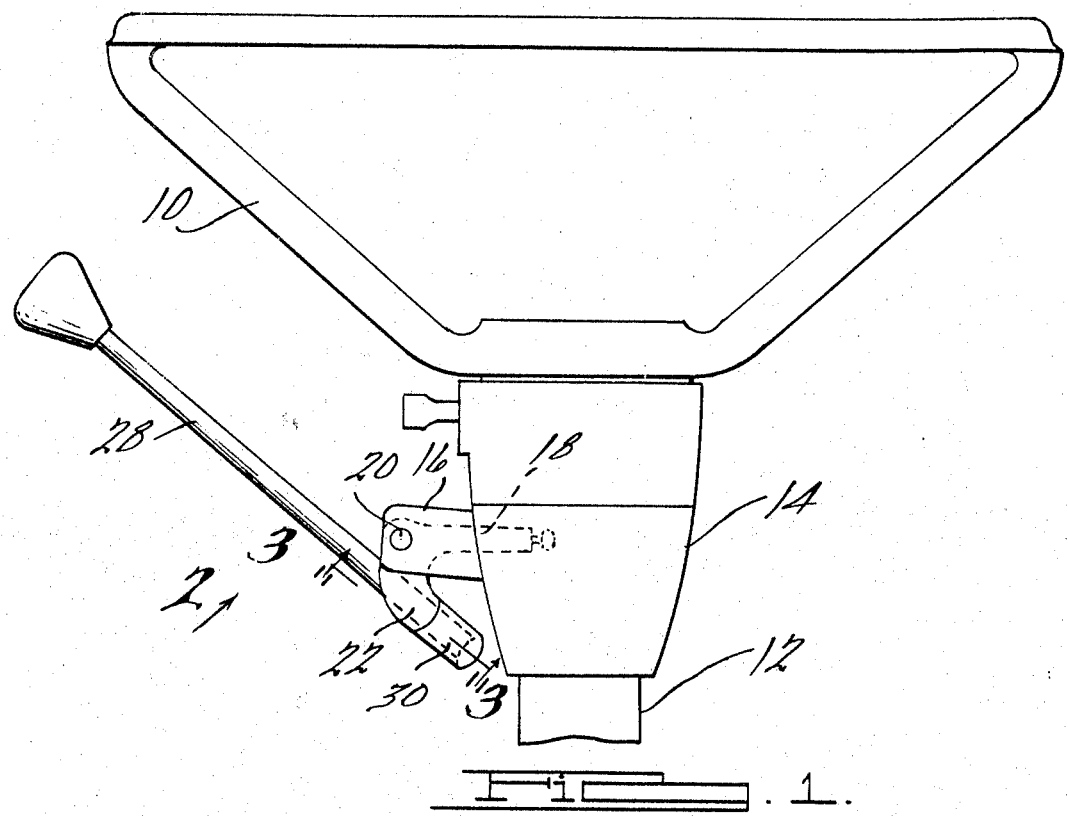
FIGURE 1 shows in schematic form an arrangement of the upper end of a typical automotive vehicle steering column assembly including a gearshift lever adapted to be controlled by the vehicle operator.
Figure 2:
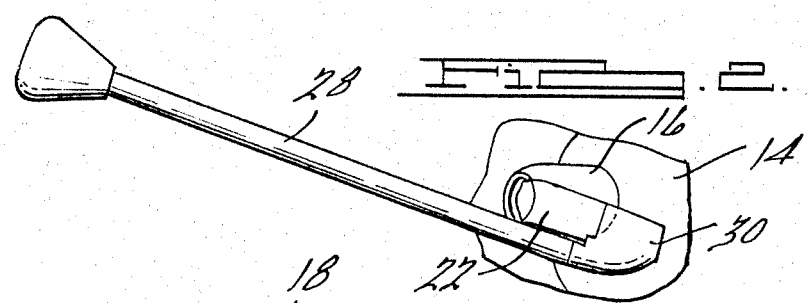
FIGURE 2 is a side view of the upper end of the steering column assembly of FIGURE 1.
Figure 3:
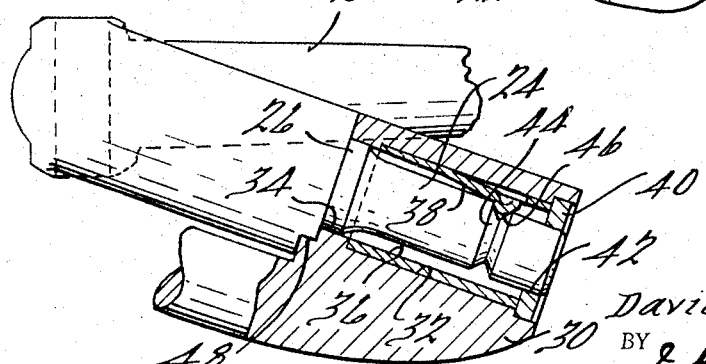
FIGURE 3 is a partial cross-sectional view taken along the plane of section line 3—3 of FIGURE 1.

In FIGURE 1 numeral 10 designates in outline form a vehicle steering wheel located within the vehicle passenger compartment. It is mounted rotatably on a steering shaft, which in turn is journaled for rotation on the steering column assembly indicated generally by reference character 12.

The upper end of the steering column assembly includes a housing shell 14, which is adapted to rotate on a fixed portion of the steering column assembly about the axis of the steering column shaft.

The shell 14 is connected directly to a tubular shift control shaft that extends concentrically with respect to the steering shaft. I contemplate, however, that the gear shift control shaft may be mounted parallel to the steering shaft rather than concentric with respect to it. In either case, the upper housing structure that is rotatably journaled on the fixed portion of the steering column assembly will include a boss or pedestal 16 extending radially from one side of the housing shell as indicated in FIGURE 1. The boss 16 is formed with a central opening through which a selector finger 18 extends, the inward end of the finger 18 being engaged with the transmission shift control shaft so that it may move the same in an axial direction as it pivots about its pivot point 20. This pivot point is in the form of a pin extending transversely through a central opening in the boss 16.

The side of the boss 16 is formed with a radially extending slot through which linkage arm 22 extends. This arm is formed integrally with the shift finger 18. The arm 22 has a reduced diameter section 24 formed integrally thereon. An annular shoulder 26 is formed at one end of the reduced diameter section 24.

The arm 22 and the section 24 have a centerline which passes below the steering column assembly 12.

A driver-controlled gearshift lever 28 is secured to the arm 22. It extends away from the centerline of the steering column 12 so that its end can be gripped by the vehicle operator. The radially inward end of the lever 28 is formed with an enlarged base 30 in which is retained a circular opening 32. An internal bearing shoulder 34 is formed within the opening 32 at one end so that it may cooperate with the shoulder 26 to provide a bearing support for the lever 28. The section 24 of the arm 22 is received within the opening 32.

The opening 32 receives therein a retainer spring 36. This is shown best in FIGURES 8 and 9. It comprises a spring steel member, preferably of rectangular shape in its preformed condition as indicated in FIGURE 8. Spring detent fingers, preferably three in number, are stamped in the spring 36, as indicated at 38. The spring 36 then is formed into a cylindrical sleeve, as indicated in FIGURE 9, with the detent fingers 38 extending into the interior of the sleeve.

The outermost end of the opening 32 in the base 30 receives a retainer washer 40 formed with an internal bearing opening 42 which registers with the end of the section 24 on the arm 22. This provides an end bearing support or shoulder for the gearshift lever 28. The diameter of the opening 42 purposely is formed substantially smaller than the diameter of the opening 34.

An intermediate region of the section 24 is formed with an annular recess 44, which registers with projection 46 carried by the spring fingers 38.

When the base 30 is assembled on the arm section 24, the spring fingers 38 hold the base 30 axially fast thereby establishing effective force transmitting connection between the lever 28 and the shift finger 18.

The shoulder 26 is formed with a flat section, as indicated best in FIGURE 7, at 48. This flat registers with a cooperating flat section 50 on base 30, as indicated best in FIGURES 5 and 5a. Sections 48 and 50 register, thereby preventing rotary motion of shift lever 28 with respect to the axis of the arm 22.

If the end of the lever 28 is subjected to an impact load with a substantial axial component, the retainer spring 36 will yield thereby allowing the lever 28 and the base 30 to slide off from the reduced diameter section 24. The lever then may pass along a line of motion which will carry it below the steering column assembly 12. As soon as the lever is displaced axially to cause the shoulder 34 to slide over the bearing surface of shoulder 26, the lever 28 becomes unrestrained.

The lever 28 still may be disassembled under impact load even though the lever itself is displaced substantially from its normal direction. The maximum offset angle which lever 28 may assume while it is being released is increased because of the difference in the bearing diameters at 42 and 26. Binding will not be experienced notwithstanding the existence of a transverse component of the impact force on lever 28.

The cross section bending modulus for the lower end of the lever 28 near the base 30 is sufficiently low to permit yielding when the lever 28 is subjected to a transverse or offset impact load that does not have a sufficient axial component to cause the lever to become disassembled. But regardless of whether the lever 28 yields by bending or whether it becomes released as an axial impact load is imparted to it, injury to the driver or vehicle passenger is avoided.

Having thus described a preferred form of my invention, what I claim and desire to secure by U.S. Letters Patent is:

1. In an automotive vehicle having a torque delivery driveline including a multiple ratio power transmission mechanism and a steering column assembly, a manually operable gearshift lever, a gearshift housing journalled for rotation about a fixed axis, said housing being carried by said steering column assembly, a gearshift selector element pivoted on said housing, a portion of said element extending within said housing, said portion of said selector element being adapted to be connected to ratio controlling parts of said transmission mechanism, one end of said shift lever and said selector element having a disengageable connection therebetween including telescoping parts, a retainer spring carried by one part and the other part of said connection engaging said retainer spring, said other part having a detent formed thereon situated in registry with said retainer spring, bearing means on said parts of said connection for supporting said parts in assembled relationship including two bearing centers spaced axially with respect to the axis of said shift lever end, and cooperating flats formed on said parts of said connection for inhibiting relative rotation between said shift lever and said selector element when they are assembled together.

2. The combination as set forth in claim 1 wherein said shift lever comprises a manually operable part and a base part, said disengageable converter comprising a circular opening formed in said base part, said selector element having a spindle formed thereon with an axis extending to one side of the axis of said steering column assembly, said spring retainer being located in the opening in said base and said detent being formed on said spindle and registering therewith, and cooperating bearing shoulders formed in said base and on said spindle at axially spaced locations with respect to the axis of said spindle.

3. The combination as set forth in claim 1 wherein the bearing diameter at the innermost bearing center is larger than the bearing diameter at the outermost bearing center.

4. The combination as set forth in claim 2 wherein the bearing diameter at the innermost bearing center is larger than the bearing diameter at the outermost bearing center.

5. The combination as set forth in claim 3 wherein said shift lever is formed with a reduced section bending modulus whereby it yields when subjected to an impact load with a substantial transverse force component.

6. The combination as set forth in claim 4 wherein said shift lever is formed with a reduced section bending modulus whereby it yields when subjected to an impact load with a substantial transverse force component.

References Cited

UNITED STATES PATENTS

| 3,091,978 | 6/1963 | Rubinstein | 74—547 |
| 3,111,041 | 11/1963 | Peras | 74—484 |

MILTON KAUFMAN, *Primary Examiner.*

U.S. Cl. X.R.

74—543; 180—82